Nov. 4, 1947.  B. R. THIELE  2,430,311
HASP-TYPE FASTENER
Filed Feb. 21, 1944  3 Sheets-Sheet 1
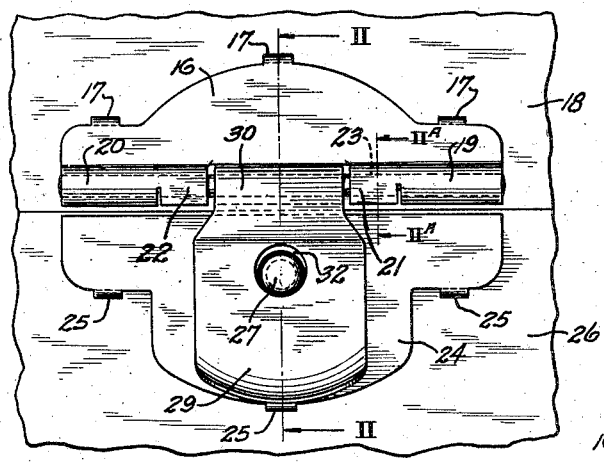
Fig. 1.
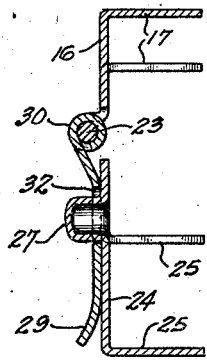
Fig. 2.
Fig. 2a.
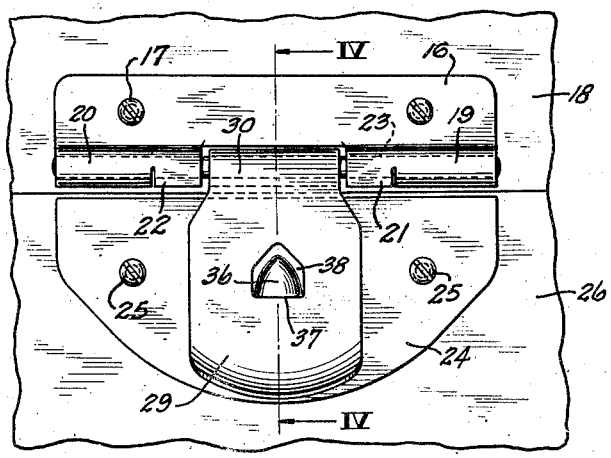
Fig. 3.
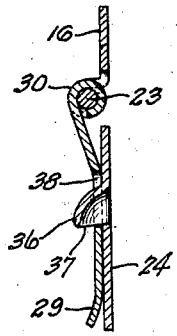
Fig. 4.
INVENTOR.
BERTHOLD R. THIELE
BY John W. Michael
ATTORNEY.

INVENTOR.
BERTHOLD R. THIELE.
BY John W. Michael
ATTORNEY.

Nov. 4, 1947.  B. R. THIELE  2,430,311
HASP-TYPE FASTENER
Filed Feb. 21, 1944  3 Sheets-Sheet 3

INVENTOR.
BERTHOLD R. THIELE.
BY John W. Michael
ATTORNEY.

Patented Nov. 4, 1947

2,430,311

UNITED STATES PATENT OFFICE 2,430,311

HASP-TYPE FASTENER

Berthold R. Thiele, Milwaukee, Wis., assignor to E. R. Wagner Manufacturing Company, Milwaukee, Wis., a corporation of Wisconsin Application February 21, 1944, Serial No. 523,204

14 Claims. (Cl. 292—281)

This invention relates to improvements in fasteners and more particularly to fasteners of the hasp type for boxes, cases, and the like.

One of the objects of the invention is to provide a fastener of this character which is extremely simple and compact in construction, reliable and effective in operation, attractive in appearance, susceptible of economical manufacture, and one which may be readily applied to a box, case or similar article.

Another object of the invention is to provide in a hasp-type fastener a resilient mount for the hasp and to so organize and relate the parts that a camming action is obtained upon movement of the hasp into closed position, tensioning the parts and avoiding accidental displacement.

Other objects and advantages reside in certain novel features of construction, arrangement and combination of parts which will be hereinafter more fully described and particularly pointed out in the appended claims, reference being had to the accompanying drawings forming a part of the specification, and in which:

Figure 1 is a front elevation of one form of the invention shown operatively applied to the hinged sections of a box, case or the like;

Figure 2 is a cross section taken on the line II—II of Fig. 1;

Figure 2a is a cross section taken on the line IIa—IIa of Figure 1;

Figure 3 is a front elevation of a modified form of the invention;

Figure 4 is a cross section taken on the line IV—IV of Figure 3;

Figure 5:
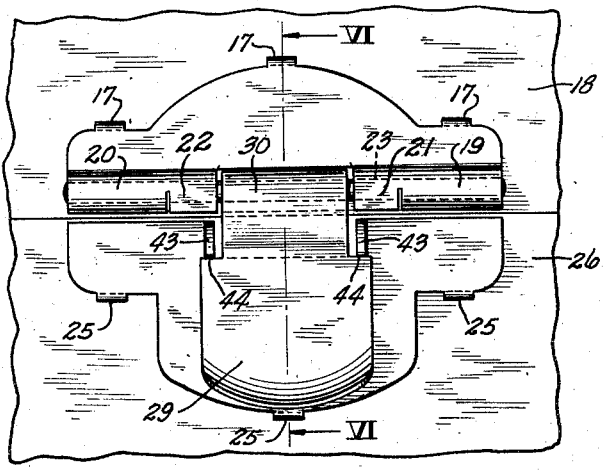
Figure 5 is a front elevation of another modification.

Referring first to the form of the invention shown in Figures 1, 2 and 2a, the fastener comprises a hinge plate 16 secured by any suitable means 17 to one of the hinged sections 18 of a box, case or the like. The edge of the plate 16 adjacent the meeting edges of the two sections of the box is provided with widely spaced barrels 19 and 20 to receive and support a resilient pin 23. The hasp designated generally at 29 is pivotally mounted upon pin 23, the upper edge of the hasp being rolled to provide a barrel 30 through which the pin extends. Adjacent the inner ends of the barrels 19 and 20 of the hinge plate the metal of the latter is rolled forwardly and downwardly to provide the aprons 21 and 22 which serve the dual function of centering the hasp on the pin 23 and concealing and obstructing access to those portions of the pin which extend between the barrel 30 of the hasp and the adjacent inner ends of barrels 19 and 20. The keeper plate of the fastener bears reference character 24 and is applied by any suitable means 25 to the other section 26 of the box or case adjacent the hinge plate 16. This plate 24 is provided with a keeper 27 shown in the drawings in the form of a hollow boss struck outwardly from the plate 24. The hasp is provided with an opening 32 adapted to engage over the keeper 27 when the hasp is in closed position. The lower edge portion of the hasp 29 is curved forwardly as shown to facilitate gripping by the fingers in moving the hasp in closing and opening.

The parts are so organized and related as to insure a camming action upon engagement of the lower edge of the hasp opening 32 with the keeper 27 as the hasp is moved into closed position, placing the hasp under tension and causing resilient yielding of the unsupported portion of the pin 23 upon which the hasp is pivotally mounted. This action and relationship of the parts in the form of invention, shown in Figures 1, 2 and 2a, results in a frictional gripping or binding of the lower edge of the hasp opening 32 with the underpart of the keeper 27 insuring positiveness in the fastening and avoiding accidental displacement.

Referring to the modification shown in Figures 3 and 4, the keeper 36 is in the form of an open ended boss, the lower edge 37 of which is slightly reentrant. In all other respects the construction shown in this modification is substantially the same as that shown in the form first described. In this form of the invention the parts are also organized and related so as to provide for the tensioning of the hasp and the resilient yielding of the pin upon movement of the hasp into closed position, the closing of the hasp first resulting in a camming action as the lower edge of the hasp opening 38 passes over the forward rounded tip of the keeper 36 in which the hasp is tensioned and the pin is flexed, and then upon movement of the hasp into final closed position a snap action is obtained as the hasp opening lower edge passes over the forward rounded end of the keeper and engages under the reentrant or upwardly inclined lower edge 37 of the keeper. In the final position of the hasp in this form of the invention it will be noted that the tension of the hasp and flexure of the pin are released and the parts are in repose with the edge of the hasp opening positioned rearwardly of the forward tip of the keeper and slightly above the horizontal plane thereof as permitted by the upward angling of the lower edge 37 of the keeper.

Figure 6:
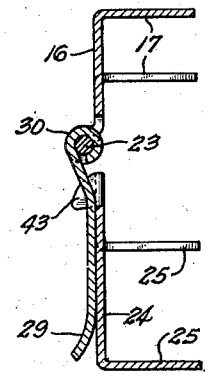
Figure 6 is a cross section taken on the line VI—VI of Figure 5.

In the form of the invention shown in Figures 5 and 6, two keepers in the form of forwardly extending lugs 43 are provided adjacent the upper edge of the keeper plate, and the hasp 29 instead of being provided with a keeper-receiving opening, as in the other forms previously described, is provided with shoulders 44 which engage under the keepers 43 in the fastening position of the hasp. The keepers in this form of the invention are also provided with rounded forward tips and reentrant or upwardly inclined edges so that substantially the same camming and snap action results when the hasp is moved into final closed position as previously described in connection with the construction shown in Figures 3 and 4

Figure 7:
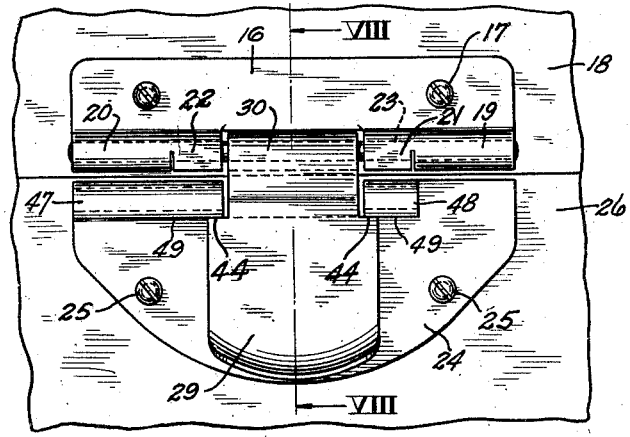
Figure 7 is a front elevation of a further modification.
Figure 8:
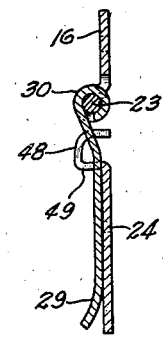
Figure 8 is a cross section taken on the line VIII—VIII of Figure 7.
Figure 9:
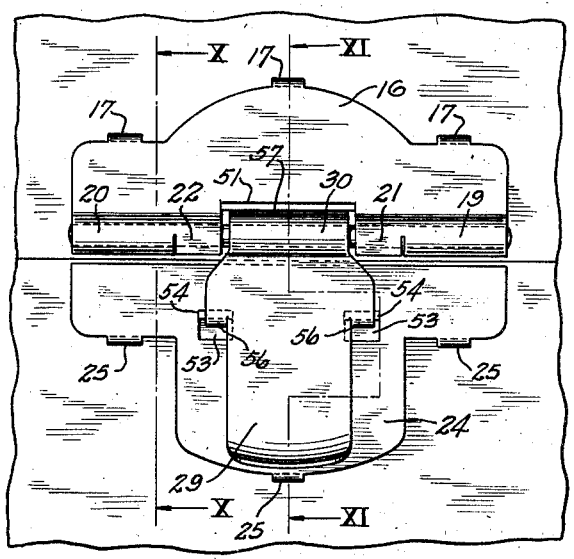
Figure 9 is a front elevation of a still further modification.
Figure 10:
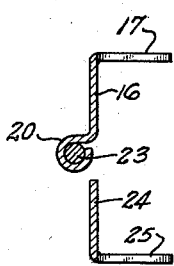
Figure 10 is a cross section taken on the line X—X of Figure 9.
Figure 11:
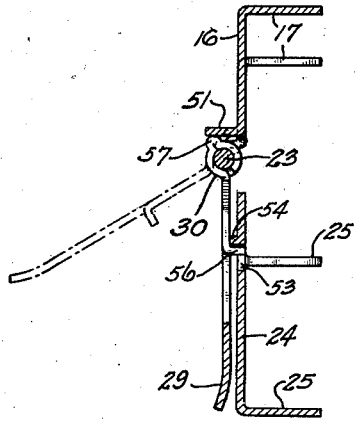
Figure 11 is a cross section taken on the line XI—XI of Figure 9.

In the construction shown in Figures 7 and 8, the keepers 47 and 48 are formed by rolling the metal of the keeper plate forwardly, upwardly and rearwardly to provide a forward curved edge 49 and to provide the camming action as the shoulders 44 of the hasp ride over them in moving the hasp to closed position. In this modification, also, the lower surface of the keepers 47 and 48 are reentrant or angled slightly upwardly so as to provide for the release of the hasp tension and pin flexure as the hasp is moved into final position. It will also be noted that by reason of the formation of the keepers 47 and 48 in this form of the invention through rolling of the metal as described, resiliency is provided in the keepers themselves in addition to that afforded by the pin 23. The keepers where formed as shown and described in this form of the invention may, depending upon convenience of manufacture, extend throughout the upper edges of the keeper plate as shown at the left in Figure 7 or but partially throughout such length as shown at the right in said figure.

In the construction shown in the modification of Figures 9, 10 and 11, 51 designates a forwardly extending flange integral with the hinge plate 16. This flange overlies the barrel 30 of the hasp 29 and the barrel 30 is provided with a longitudinal eccentric rib 57 which engages the undersurface of the flange 51 to provide a camming action which holds the hasp either in closed position, as shown in full lines in Figure 11, or in open position, as shown in dotted lines in said figure. The hasp is provided with inturned lugs or fingers 56 which engage, when the hasp is closed, in openings 53 provided in the keeper plate 24. The upper edges of the openings 53 are provided with forward flanges or keepers 54 which limit the inward closing movement of the hasp and prevent separation of the box sections when the hasp is in closed position. The formation of the flange 51 in the manner described imparts considerable resiliency thereto which of course supplements the resiliency of the central unsupported portion of the pin 23 to augment the positiveness of operation in the camming action which results between the rib 57 and the flange 51 as the hasp is moved into closed and opened positions. It will be observed that there is no tensioning of the hasp in this form of the invention. In closed position, the lugs 56 merely hook under the keepers 54. The camming action and the snap action in the closing of the hasp are imparted entirely by the coaction between the cam rib 57 and the flange 51.

While I have shown and described several constructions in which the invention may be advantageously embodied, it is to be understood that various other changes and modifications may be made therein without departing from the spirit of the invention as defined in the appended claims.

I claim:

1. A fastener of the character described for a box or the like comprising a plate mounted on one box section, said plate being provided with widely spaced pin-receiving barrels, a resilient pin mounted in said barrels, said pin being unsupported intermediate said barrels, a hasp pivoted upon said pin and spaced from the inner ends of said barrels, means for centering said hasp and concealing and protecting the portions of said pin intermediate the barrels and hasp, a keeper mounted on the other box section and adapted to be engaged by said hasp in fastening the sections in closed relation, the relationship being such that as the hasp is moved to closed position the same is cammed downwardly causing said pin to yield.

2. In a box fastener, a pivot pin mounted on one box section, a keeper mounted on the other, a hasp pivotally mounted on said pin and provided with camming means, a flange overlying and engaged by the camming means, the coaction between said camming means and flange serving to hold the hasp in engagement with the keeper when the hasp is closed and in open position when the hasp is swung to disengage it from the keeper.

3. In a box fastener, a pivot pin mounted on one box section, a keeper mounted on the other, a hasp pivotally mounted on said pin and provided with camming means, a flange overlying and engaged by the camming means, the coaction between said camming means and flange serving to hold the hasp in engagement with the keeper when the hasp is closed and in open position when the hasp is swung to disengage it from the keeper, the engagement of the cam with the flange having a dead-center position and serving to snap the hasp closed when moved to one side of such position and open when moved to the other.

4. In a box fastener, a resilient pin mounted on one box section, a keeper mounted on the other, a hasp pivotally mounted on said pin and provided with camming means, a flange overlying and engaged by the camming means, the coaction between said camming means and flange serving to hold the hasp in engagement with the keeper when the hasp is closed and in open position when the hasp is swung to disengage it from the keeper, the resiliency of the pin acting to augment the positiveness of the movement of the hasp into closed position and the holding of the same in such position.

5. In a box fastener, a pivot pin mounted on one box section, a keeper mounted on the other, a hasp pivotally mounted on said pin and provided with camming means, a resilient flange overlying and engaged by the camming means, the coaction between said camming means and flange serving to hold the hasp in engagement with the keeper when the hasp is closed and in open position when the hasp is swung to disengage it from the keeper, the resiliency of the flange acting to augment the positiveness of the movement of the hasp into closed position and the holding of the same in such position.

6. In a box fastener, a resilient pin mounted on one box section, a keeper mounted on the other, a hasp pivotally mounted on said pin and provided with camming means, a resilient flange overlying and engaged by the camming means, the coaction between said camming means and flange serving to hold the hasp in engagement with the keeper when the hasp is closed and in open position when the hasp is swung to disengage it from the keeper, the resiliency of the flange and the pin acting to augment the positiveness of the movement of the hasp into closed position and the holding of the same in such position.

7. A box fastener of the hasp type comprising a resilient hinge pin having portions supported on one box section and spaced by an unsupported portion, a hasp mounted on the unsupported portion of the pin in spaced relation to at least one of the supported portions thereof, and a keeper mounted on the other box section and having a cam surface engageable by the hasp and flexing the unsupported portion of the pin upon such engagement.

8. A box fastener of the hasp type comprising a hinge plate mounted on one box section, a resilient hinge pin having portions supported by the hinge plate at the ends of unsupported portion of the pin, a hasp mounted on the unsupported portion of the pin and spaced from the hinge plate portions supporting the hinge pin, and a keeper mounted on the other box section and having a surface engageable by the hasp with a camming action flexing the unsupported portion of the pin.

9. A box fastener of the hasp type comprising a hinge plate mounted on one box section and having spaced barrels formed thereon, a resilient hinge pin mounted in the barrels and extending across the space therebetween, a hasp mounted on the pin between the barrels and spaced from the ends thereof, and a keeper mounted on another box section and engageable with the hasp by an action flexing the pin portions between the plate barrels and the hasp.

10. A box fastener of the hasp type comprising a hinge plate mounted on one box section and having spaced barrels formed thereon, a resilient hinge pin mounted in the barrels and extending across the space therebetween, portions of the adjacent ends of the barrels being formed as aprons partially enclosing the pin portion extending between the barrels, a hasp mounted on the pin between the plate barrel aprons, and a keeper engageable with the hasp upon flexure of the pin portions enclosed by the aprons.

11. A box fastener of the hasp type comprising a hinge plate mounted on one box section and having spaced barrels formed thereon, a resilient hinge pin mounted in the barrels and extending across the space therebetween, a hasp mounted on the pin between the barrels and in spaced relation to the ends thereof, and a keeper mounted on another box section and having a rounded tip and a reentrant portion rearwardly of the tip, engagement of the hasp with the keeper tip causing flexure of the pin and engagement of the hasp with the reentrant keeper portion releasing flexure of the pin.

12. A box fastener of the hasp type comprising a resilient hinge pin having portions supported on one box section and having an unsupported portion, a hasp mounted on the unsupported portion of the pin between and in spaced relationship to the supported portions thereof and a resilient keeper mounted on another box portion, the keeper flexing upon engagement with the hasp and having a rounded tip engageable by the hasp and flexing the unsupported pin portion upon engagement therewith, flexure of the pin and of the keeper holding the hasp under tension.

13. A box fastener of the hasp type comprising a resilient hinge pin having portions supported on one box section and having an unsupported portion, a hasp mounted on the unsupported portion of the pin and in spaced relation to the supported portions thereof, and a resilient keeper mounted on another box section and flexing upon engagement thereof by the hasp and having a rounded tip and a reentrant portion, engagement of the hasp with the keeper tip flexing the unsupported pin portion and engagement of the hasp with the keeper reentrant portion releasing flexure of the pin.

14. A box fastener of the hasp type comprising a hinge plate mounted on one box section and having spaced barrels formed thereon, a resilient hinge pin mounted in and supported only by the barrels and extending across the space therebetween in unsupported relation, a hasp mounted on the pin in spaced relation to the barrel ends by portions of the adjacent ends of the barrels extending therefrom to center the hasp on the plate, and a keeper engageable with a hasp upon flexure of the unsupported hinge portion.

BERTHOLD R. THIELE.

REFERENCES CITED

The following references are of record in the file of this patent:

UNITED STATES PATENTS

| Number | Name | Date |
|---|---|---|
| 1,061,032 | Baker | May 6, 1913 |
| 1,347,364 | Edmonds | July 20, 1920 |
| 2,059,821 | Spitalny | Nov. 3, 1936 |
| 633,269 | Moore | Sept. 19, 1899 |
| 1,479,213 | Benedict et al. | Jan. 1, 1924 |
| 1,749,983 | Nelson | Mar. 11, 1930 |
| 1,793,078 | Frye | Feb. 17, 1931 |
| 1,836,122 | Johnson | Dec. 15, 1931 |
| 414,590 | Rubin | Nov. 5, 1889 |